United States Patent Office 3,597,186
Patented Aug. 3, 1971

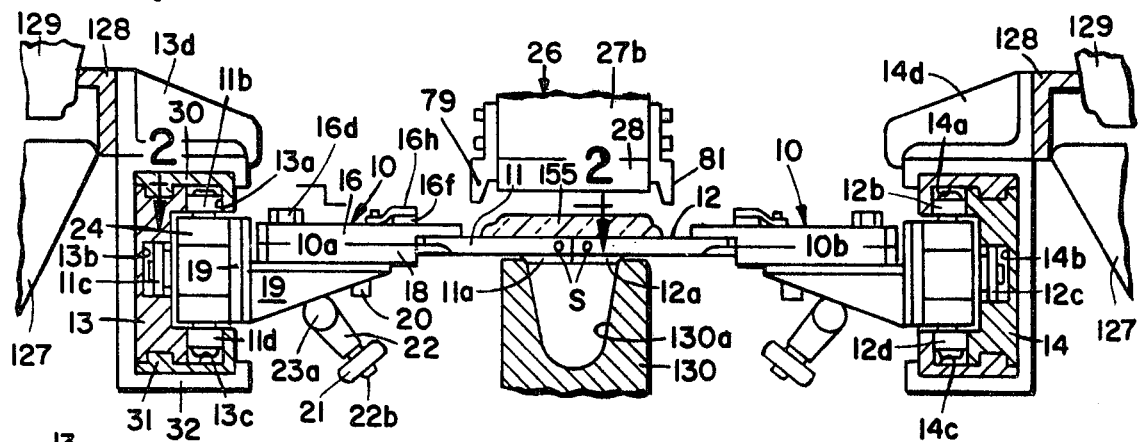

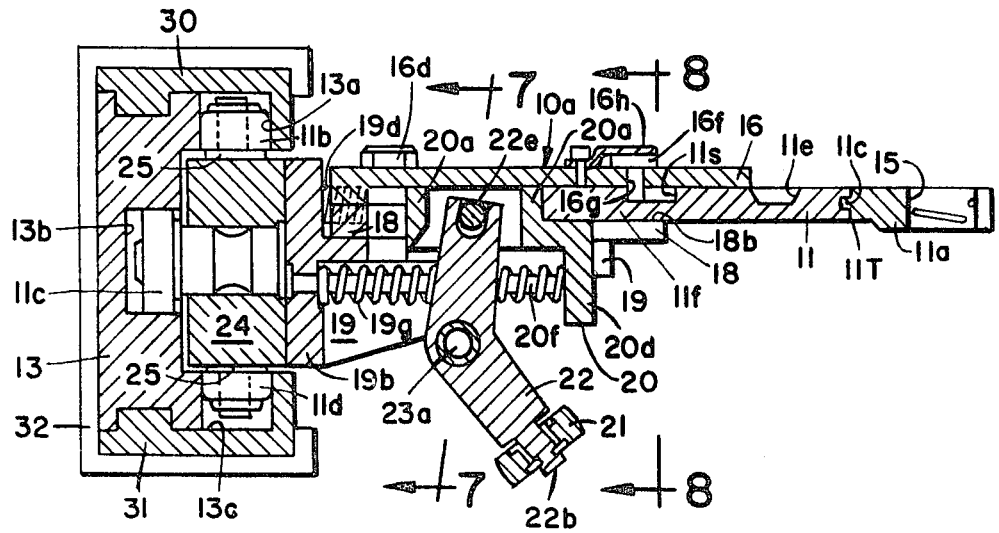

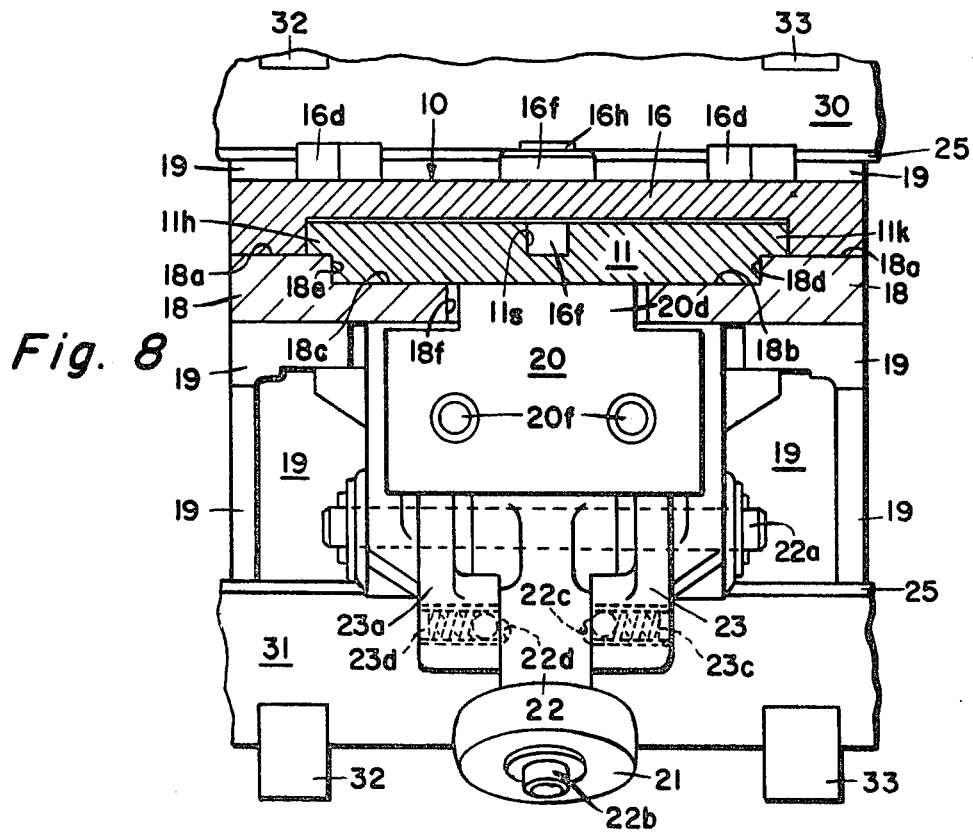
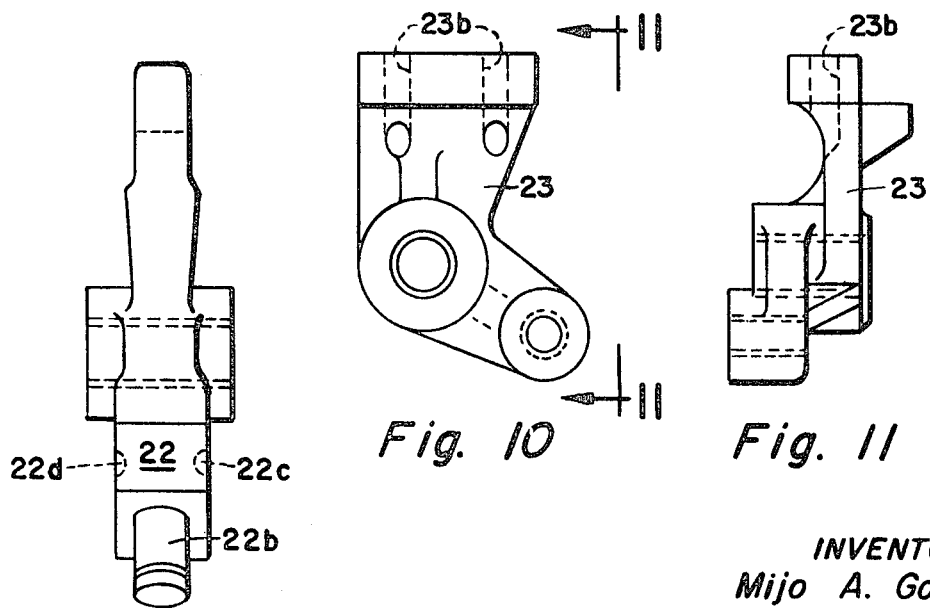
Fig. 9  Fig. 10  Fig. 11
INVENTORS.
Mijo A. Gossie
Roy N. Sundstrom
William R. Wisner
Edward J. Zak
BY Charles W. Gregg
AGENT

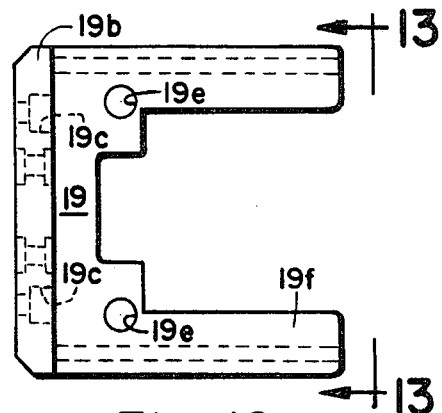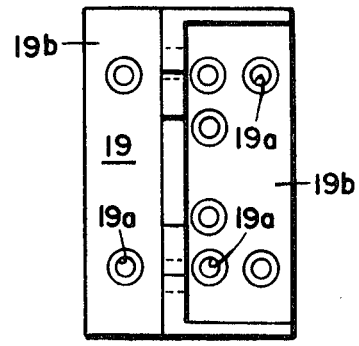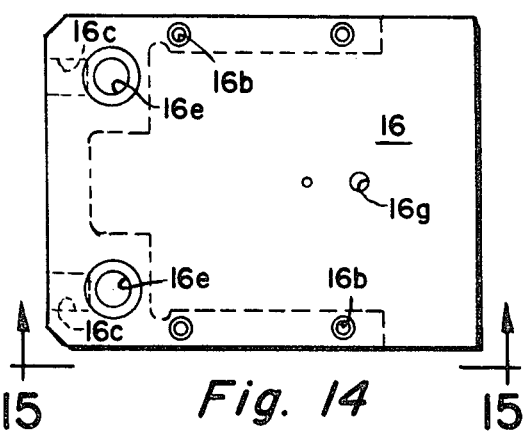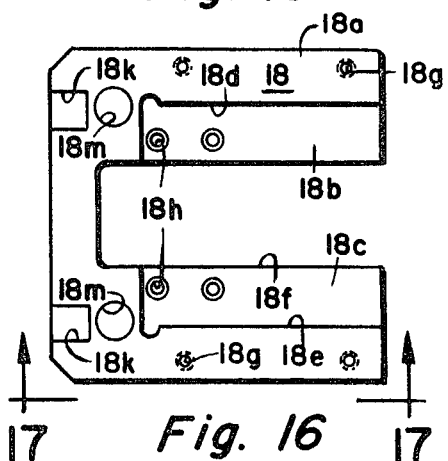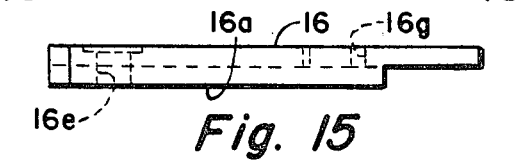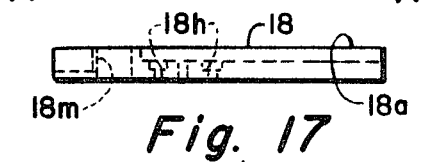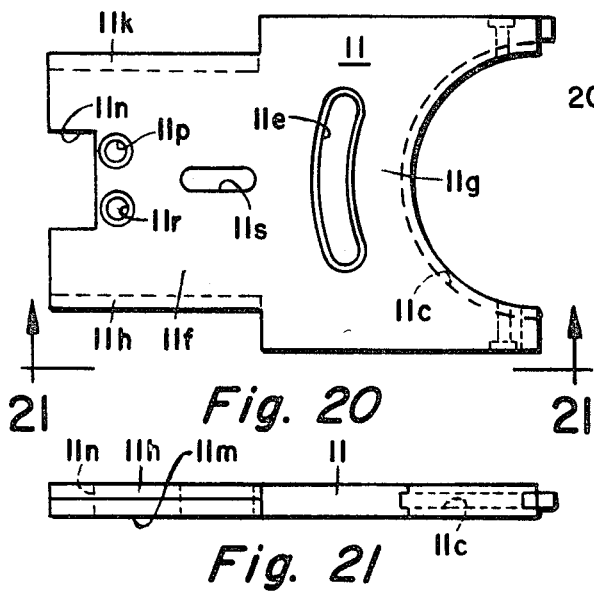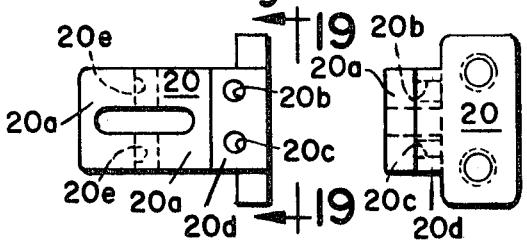

3,597,186
NECK RING MOLD MECHANISM
Mijo A. Gossie and Roy N. Sundstrom, Corning, William R. Wisner, Big Flats, and Edward J. Zak, Corning, N.Y., assignors to Corning Glass Works, Corning, N.Y.
Filed Apr. 4, 1969, Ser. No. 813,664
Int. Cl. C03b 9/00
U.S. Cl. 65—240    9 Claims

ABSTRACT OF THE DISCLOSURE

An axially separable neck ring mold mechanism or orifice plate comprising a pair of complemental and cooperative axially separable male and female neck ring mold halves, and an identical holder and support assembly for each mold half, each holder being resiliently horizontally mounted within the support of the respective assembly for optimum linear alignment of such holders and their associated mold halves with each other, each of the assemblies including a set of rollers or wheels by which such assemblies can, for example be moved along associated sets of first and second sets of rails or tracks which extend parallel with each other on opposite sides of a selected path of travel for said mold halves, such mold halves and their associated assemblies carrying a ribbon of molten glass in a glass working machine for forming articles such as containers from the glass ribbon.

BACKGROUND OF THE INVENTION

There is shown in U.S. Patent 1,790,397 issued January 27, 1931 to William J. Woods and David E. Gray, a glass working machine for forming glass articles such as electric lamp bulbs at an extremely high rate of speed as, for example, on the order of 120 bulbs per minute. It has heretofore been proposed to adapt such a machine to the forming of thin-walled glass containers including necks having lips or threads for attachment of sealing caps thereto. However, for various reasons, the heretofore adaptations of the so-called "ribbon machine" to the forming of glass containers have not been satisfactory.

With the relatively recent advent of high strength glasses, interest in thin-walled and, therefore, light-weight and economically disposable containers has been renewed, and the novel mechanism of the present invention was developed to be used, in conjunction with a parison mold and a cooperative novel blow-head assembly, for the forming of such types of containers on a machine such as that covered by the aforesaid patent to Woods et al. Said novel blow-head assembly, with which the mechanism of the present invention is employed is not, per se, a part of the present invention but is subject matter of a separate patent application of Roy N. Sundstrom and William R. Wisner, Ser. No. 813,534, filed on even date herewith and assigned to the same assignee as the present application.

SUMMARY OF THE INVENTION

Briefly, the present invention relates to a neck ring mold mechanism or orifice plate including a pair of cooperative and axially separable neck ring mold halves, and a holder and support assembly for each said mold half, each such holder being mounted in its respectively associated support assembly so that the holders of cooperative assemblies are resiliently horizontally movable for linear self-alignment with each other. Each said assembly includes a set of rollers for cooperation with rails provided on a glass working machine, such as that disclosed in Woods et al., so that associated pairs of said assemblies may be moved parallel with the path of travel of the glass ribbon associated with said machine and at a speed corresponding to that of such ribbon. The neck ring mold mechanism also includes means by which the neck ring mold halves can be locked in a closed complementary and cooperative relationship with each other by one of the aforementioned novel blowhead assemblies. The lower parts of the associated neck ring mold halves are cooperative with a parison mold which is also carried on said machine in a manner well known in the art and at a speed corresponding to that of said glass ribbon.

BRIEF DESCRIPTION OF THE DRAWINGS

In the drawings:

FIG. 1 is an elevational view, partly in cross section, illustrating the neck ring mold mechanism embodying the invention and used in conjunction with a cooperative blowhead assembly and parison mold;

FIG. 2 is a top plan view of one of the neck ring mold holder and support assemblies of the mechanism of FIG. 1, such view being taken generally along line 2—2 of FIG. 1;

FIGS. 3 and 4 are detail views of a linkage member used in the neck ring mold assemblies;

FIG. 5 is a detail view of a type of washer employed in said assembly;

FIG. 6 is a cross-sectional view of the assembly of FIG. 2 and taken generally along line 6—6 of FIG. 2;

FIGS. 7 and 8 are cross-sectional views taken generally along lines 7—7 and 8—8, respectively, of FIG. 6;

FIG. 9 is a detailed view of a crank arm employed in said assembly;

FIGS. 10 and 11 are detailed views of a support employed in said assembly for pivotally supporting said crank arm; and FIGS. 12 through 21 are detail views of parts of the neck ring mold assembly shown in FIGS. 2 and 6.

Similar reference characters refer to similar parts in each of the figures of the drawings.

PREFERRED EMBODIMENT OF THE INVENTION

In general, and with reference to FIGS. 1 and 2 of the drawings, the neck ring mold mechanism 10 embodying the invention comprises a first neck ring mold half holder and support assembly 10a including a holder 11 with a male type of neck ring mold half 11a, and a second neck ring mold assembly 10b with a female type of neck ring mold valve 12a. Mold halves 11a and 12a have tongues 11T and 12T, respectively which protrude from and extend about the semicircular outer periphery of each respective mold half, each said tongue fitting in a complemental channel such as 11c and 12c provided in holders 11 and 12, respectively. (See FIGS. 2, 6, 20 and 21.) Such complemental tongues and grooves mount mold halves 11a and 12a in holders 11 and 12, respectively, and set screws such as S are screwed into cooperatively threaded holes in holders 11 and 12, and into cooperative holes in mold halves 11a and 12a, to removably secure the mold halves in their respective holders. Neck ring mold halves 11a and 12a having depending bottom portions (FIG. 1) which are tapered inwardly toward the center of the cavity 15 formed by such mold halves in their closed positions. Said tapered bottom portions of the neck ring mold halves are for encirclement by the cooperatively tapered and matching upper end of the mold cavity 130a of a parison mold 130. Such upper end of cavity 130a aids in maintaining mold halves 11a and 12a together during the forming of a glass charge in the neck ring and parison molds, as hereinafter discussed.

The upper surfaces of holders 11 and 12 for the neck ring mold halves 11a and 12a are provided with arcuate channels 11e and 12e (FIG. 2) whose arcs of curvature coincide with arcs of circumferences of circles having as their center the center of the previously mentioned orifice 15 formed by neck ring mold halves 11a and 12a in their closed positions. As illustrated in FIG. 1, a blow-head assembly 26 is supported above holders 11 and 12, and neck ring mold halves 11a and 12a, with the center of a lower portion 27b of a sleeve member of said assembly in vertical axial alignment with the center of orifice 15 in mold halves 11a and 12a. Two pairs of fingers such as 79 and 81 are attached to opposite sides of the outer periphery of said lower portion 27b with the lower ends of such fingers depending below the remainder of blow-head assembly 26 in alignment with channels 11e and 12e, respectively, in the top surfaces of neck ring mold half holders 11 and 12. The inner surfaces of said fingers have arcs of curvature corresponding to said arcs of curvature of said channels 11e and 12e, and said inner surfaces slope downwardly away from the center of blow-head assembly 26. It will be apparent, therefore, that said pairs of fingers such as 79 and 81 are cooperative with said channels 11e and 12e, respectively, to cause holders 11 and 12 to lock neck ring mold halves 11a and 12a in their closed position when the blow-head assembly such as 26 is lowered so that said pairs of fingers enter the respectively associated arcuate channels 11e and 12e.

As previously mentioned the blow-head assembly such as 26 forms, per se, no part of the present invention, such assembly being a subject matter of the previously cited copending patent application Ser. No. 813,534, which was filed on even date herewith and is assigned to the same assignee of the present application. For a disclosure of a complete blow-head assembly such as 26, reference may be had to such copending application.

Before discussing further details of the novel neck ring mold mechanism herein disclosed, it is believed expedient to point out that such mechanism, as previously mentioned, is indicated by the reference character 10 in FIG. 1 of the drawings and includes a pair of neck ring mold assemblies designated 10a and 10b which are identical to each other but are, as illustrated in FIG. 1, disposed oppositely each other for cooperation therebetween to make the complete neck ring mold mechanism 10 for the complemental neck ring mold halves 11a and 12a discussed above. Since, therefore, neck ring mold assemblies 10a and 10b are identical to each other, only one such assembly 10a will be described in detail.

Assembly 10a includes an upper plate member 16 (FIGS. 14 and 15) a lower plate member 18 (FIGS. 16 and 17) and a support member 19 (FIGS. 12 and 13) for said plate members. Plate members 16 and 18 are disposed so that the bottom surface 16a of plate member 16 (FIG. 15) is in contact with the top surface 18a of plate member 18 (FIGS. 16 and 17). The previously mentioned holder 11 (FIGS. 20 and 21) includes a first portion 11f of a first width and a second portion 11g of a wider width than portion 11f. The longitudinal edges of bottom portion 11f of holder 11 are recessed to form ledges 11h and 11k. The first portion 11f of holder 11 fits snugly but slidably in the cavity formed between plate members 16 and 18 when such members are disposed in said facing relationship as described above. When such portion 11f of holder 11 is inserted in said cavity, the extreme bottom surface 11m (FIG. 21) of portion 11f of holder 11 rests on the top surfaces 18b and 18c of recessed portions 18d and 18e, respectively (FIG. 17) of plate member 18, while the bottom surfaces of ledges 11h and 11k of holder 11 rest on the top surface 18a of plate member 18. Holder 11 is, therefore, longitudinally slidably movable in said cavity. (See also FIGS. 6, 7 and 8.)

Prior to insertion of portion 11f in holder 11 in said cavity between plate members 16 and 18, portion 20a of a member 20 (FIGS. 6, 18 and 19) is inserted in a recess 11n (FIGS. 20 and 21) of holder 11 and a pair of flat headed screws (not shown) are inserted in holes 11p and 11r (FIG. 20) in holder 11 and are screwed into cooperating threads provided in holes 20b and 20c in portion 20d (FIGS. 18 and 19) of member 20. Holder 11 and member 20 are, thereby, secured to each other and such holder may now be inserted, as discussed above, into the aforesaid cavity provided between plate members 16 and 18. Following such insertion member 20 depends from holder 11 and extends downwardly through opening 18f in member 18 (FIGS. 7, 8 and 16).

Plate members 16 and 18 are secured to each other in their previously mentioned facing relationship by screws such as 16b (FIGS. 2 and 7) which extend downwardly through holes such as 16c (FIGS. 7 and 14) in plate member 16 and are screwed into cooperative threads provided in holes such as 18g (FIGS. 7 and 16) in plate member 18. However, prior to such securing of plate members 16 and 18 to each other, a pair of right hand and left hand supports 23 and 23a, respectively viewing FIGS. 7 and 8) for a crank arm 22 (FIGS. 6 through 9) are secured to the bottom surface of plate 18 by suitable screws such as 23d and 23e, respectively. Such screws extend through holes such as 18h (FIGS. 7, 16 and 17) provided in member 18 and are screwed into cooperating threads provided in holes, such as 23b, extending downwardly in the upper part of support 23 (FIGS. 7, 10 and 11) and holes, such as 23c, extending downwardly in the upper part of support 23a (FIG. 7) respectively. FIGS. 10 and 11 best illustrate the configuration of right hand support 23 and it will be readily understood that the configuration of support 23a is a mirror image of support 23. This will be readily apparent from a brief glance at FIGS. 7 and 8 of the drawings.

Previously mentioned arm 22 (FIG. 9) is pivotally supported between supports 23 and 23a by a suitable axle or pin 22a as illustrated in FIGS. 7 and 8. The lower end of crank arm 22 includes a short axle 22b upon which a wheel or roller 21 (FIGS. 1, 6 and 21) is secured, such wheel or roller being freely rotatable upon axle 22b. The lower ends of supports 23 and 23a embody a pair of spring biased ball detent assemblies 23c and 23d, respectively (FIG. 8) the balls of which are biased toward opposite sides of crank arm 22 and rest against such sides when holder 11 is in an extended position as hereinafter discussed. Crank arm 22 includes a pair of semi-spherical orifices 22c and 22d into which the balls of detent assemblies 23c and 23d enter when holder 11 is in a non-extended position as also hereinafter discussed. Spring biased ball detent assemblies such as 23c and 23d are well known. The upper end of crank arm 22 is forked (see FIGS. 6 and 7) and a pin or shaft 22e extends through suitable passages such as 20e in portion 20a of member 20 (FIGS. 6, 7 and 18) and between the prongs of the fork provided on the upper end of crank arm 22. The purpose of such arrangement will also be discussed hereinafter.

A bracket member 19 is shown in FIGS. 1, 2, 6, 7, 8, 12 and 13 of the drawings and is secured to a linkage member 24 shown in FIGS. 1, 2, 3, 4, and 6 of the drawings and best illustrated in FIGS. 3, 4 and 6. Linkage member 24 includes a plurality of threaded holes, such as 24a (FIG. 3) which correspond to holes such as 19a provided in an upright portion 19b of bracket member 19, and flat headed screws (not shown) extend through the holes such as 19a in member 19, and are screwed into the threads provided in the holes such as 24a in member 24 to secure said members to each other, as mentioned above. Following such attachment of members 19 and 24 to each other, the previously discussed components such as 11, 16, 18, 20, 22, 23 etc., which have been assemblied as previously discussed, are mounted on bracket member 19 in the following described manner.

Members 16 and 18 have cooperative semicircular channels such as 16c and 18k (FIGS. 14 and 16) which provide circular holes when such members are secured to each other as described above. Bracket member 19 embodies holes 19c, FIG. 12) which are complemental to the holes such as 16c and 18k in members 16 and 18. First ends of a pair of short compressible coil springs such as 19d (FIGS. 2 and 6) are disposed in holes 19c in member 19 and the second ends of such springs extend into said holes provided by channels 16c and 18k. A pair of bolts such as 16d (FIGS. 1, 2, 6, 7 and 8) extend loosely through holes such as 16e and 18m (FIGS. 14 and 16) provided in members 16 and 18, and the lower ends of the bolts such as 16d are screwed into cooperative threads provided in holes such as 19e in member 19. Thus members 16 and 18 are secured to the top of bracket member 19 with the lower surface of member 18 in sliding contact with the upper surface 19f of member 19, while the above mentioned springs such as 19d allow a limited amount of horizontal sliding movement between such surfaces to provide a self-alignment arrangement between members 11 and 12 of a pair of associated assemblies such as 10a and 10b. This will be apparent from a brief glance at FIGS. 1 and 2 of the drawings.

Referring to FIGS. 6, 7 and 8 of the drawings, a pair of guide rods such as 20f extend between members 19 and 20 and are surrounded by a relatively long compressible pair of coil springs, such as 19g, whose ends bear against portion 19b of member 19 and portion 20d of member 20 to normally resiliently urge member 20 towards its position shown in FIG. 6. This also normally urges member 11 to its extended position shown in FIG. 6. It will be noted that member 11 includes in its upper surface an oblong channel 11s (FIGS. 2, 6, 8 and 20) in which is disposed the lower end of a headed pin 16f, the shank of the pin extending downwardly through a hole 16g in member 16 and into said channel 11s. A leaf spring member 16h bears downwardly against the head of pin 16f and normally maintains the lower end of the pin in channel 11s.

Previously mentioned linkage member 24 (FIGS. 3 and 4) is provided with freely rotatable rollers such as 11b, 11c and 11d which ride in guide channels 13a, 13b and 13c, respectively, provided in a track of rail assembly 13, including support members 30 and 31, and bracket members 32 and 33. Members 32 and 33 are secured in any convenient manner to additional brackets such as 13d (FIG. 1) shown attached to a horizontal tie bar 128 which is, in turn, secured to a yoke 129 which is supported on top of a standard such as 127. Neck ring mold assembly 10b (FIG. 1) is illustrated as supported in a manner similar to that for assembly 10a. Such supporting arrangement includes a track or rail assembly 14 including guide channels such as 14a, 14b and 14c in which rollers or wheels such as 12b, 12c and 12d are respectively disposed. Rail assembly 14 also includes a bracket 14d which is secured in any convenient manner to tie bar 128 secured to yoke 129 supported on top of standard 127. The members such as 127, 128 and 129 form, per se, no part of the present invention but such members correspond, respectively, to tie bars 59, yoke 60, and standards 57 shown in FIG. 3A of the aforesaid patent to Woods et al. Brackets 13d and 14d shown in FIG. 1 are similar to left and right hand brackets 180 also shown in said FIG. 3A of the Woods patent.

It is apparent from the above discussed arrangement that a neck ring mold mechanism comprising associated pairs of neck ring mold assemblies such as 10a and 10b can be mounted on a glass working machine such as disclosed in the Woods et al., patent for movement of such assemblies through horizontal looped and complemental paths of travel in a manner similar to that shown in FIGS. 4 and 9 of the drawings of such patent. Attention is also again called to the previously mentioned copending patent application of Roy N. Sundstrom and William R. Wisner, and especially to FIG. 13 of such application and the description in connection therewith, if further discussion concerning the use of a neck ring mold mechanism, comprising associated pairs of neck ring mold assemblies such as 10a and 10b, on a machine of the type covered by the cited Woods et al., patent is desired. It is, however, pointed out that the above mentioned linkage member 24 is shown in FIGS. 2 and 7 as being pivotally connected to adjoining linkage members 24A and 24B, and, as will be readily apparent to those skilled in the art, such adjoining linkage members may be similarly connected to additional linkage members to provide an endless chain arrangement for movement of such members and associated neck ring mold assemblies through a horizontal looped path of travel as in the Woods et al. patent or as shown in said copending application.

The apparatus of the present invention having been discussed in detail, a brief operational example of the invention will now be set forth.

In employing a neck ring mold mechanism embodying the present invention, a pair of cooperative and complemental neck ring mold assemblies such as 10a and 10b, and including holders 11 and 12, and a pair of respectively associated and cooperative male and female neck ring mold halves 11a and 12a are intended to be used with a blow-head assembly such as 26 (FIG. 1) of the type covered by the previously mentioned copending and commonly owned patent application of Roy N. Sundstrom et al. Since, as previously pointed out, neck ring mold assembly 10b is identical to neck ring mold assembly 10a only the operation of the latter assembly will be discussed in detail although, of course, neck ring mold mechanism 10 comprises a pair of assemblies such as 10a and 10b disposed in a facing relationship with each other as illustrated in FIGS. 1 and 2 of the drawings.

A neck ring mold assembly such as 10a, when used with a blow-head assembly such as 26 and a parison mold such as 130 (FIG. 1) for forming parisons or preforms from charges such as 155 of molten glass, is in its extended position, that is, holder 11 is not in its retracted position within the previously mentioned cavity formed between plate members 16 and 18. Holder 11 is actuated to such extended position by a suitable actuating device, such as a suitable rail or track, which contacts the outer periphery of roller or wheel 21 on the bottom of crank arm 22 and overcomes the force of detent assemblies or devices such as 23c and 23d (FIG. 8) which hold holder 11 in its said retracted position until actuated to its extended position mentioned. When the balls of said detent assemblies 23c and 23d are actuated out of their respectively associated cavities or orifices such as 22c and 22d (FIG. 8) in crank arm 22, the springs such as 19g (FIGS. 6 and 7) push member 20 and, thereby, holder 11 to its extended position mentioned.

It will be understood that holder 12 of neck ring mold assembly 10b is actuated, similar to that described above for holder 11, by a suitable actuating device such as a rail or track which contacts the outer periphery of the roller on the lower end of the crank arm of assembly 10b. By such actuation of holders 11 and 12 of assemblies 10a and 10b of mechanism 10, neck ring mold halves 11a and 12a are moved toward each other and projections such as 11t (FIG. 2) on the face of male mold half 11a enter channels such as 12t provided on the face of female mold half 12a, such channels being complemental to said projections as is apparent from a brief glance at FIG. 2 of the drawings. The neck ring mold cavity such as 15 is thereby formed by neck ring mold halves 11a and 12a.

If, during the actuation of the holders 11 and 12 and of the associated neck ring mold halves 11a and 12a toward each other as discussed above, assemblies 10a and 10b of mechanism 10 are not, as illustrated in FIG. 2, aligned exactly with each other, members such as 16 and 18 of assembly 10a will move horizontally against the pressure of the previously mentioned coil springs such as 19d (FIG. 2) while the corresponding components of assembly 10b will similarly and correspondingly move to attain the desired alignment and closed relationship between neck ring mold halves 11a and 12a. Such movement of said components of assemblies 10a and 10b is caused by the associated pairs of projections and channels such as 11t and 12t in mold halves 11a and 12a attempting to become seated with each other. This will now be apparent to those skilled in the art.

Following the closing of the neck ring mold halves 11a and 12a as discussed above, a blow-head assembly such as 26 (FIG. 1) can be lowered and the downwardly projecting fingers such as 79 and 81 on portion 27b of the sleeve member of assembly 27 will then enter the complemental arcuate channels such as 11e and 12e (FIG. 2) in holders 11 and 12, respectively, to tightly force neck ring mold halves 11a and 12a into contact with each other and lock such mold halves in their cooperative position shown in FIG. 2. A parison mold such as 130 is moved upwardly into cooperative parison forming position with lower extending parts of the closed neck ring mold halves 11a and 12a as illustrated in FIG. 1, and the blow-head assembly such as 26 can then be used, in conjunction with parison mold 130, to form a parison or preform from a charge of molten glass such as 155 deposited on the top surfaces of holders 11 and 12 and of neck ring mold halves 11a and 12a. The method of so forming a parison or preform is not a part of the present invention but is disclosed and claimed in the previously mentioned copending and commonly owned patent application of Roy N. Sundstrom et al.

Although the neck ring mold mechanism and assemblies herein disclosed have been discussed as usuable in conjunction with a glass working machine as covered by the aforecited patent to Woods et al., the use of such mechanism and assemblies is not intended to be confined to such a machine but the mechanism and assemblies may be readily adapted for use in any type of machine on which a blow-head assembly such as 26 is to be used for forming parisons or preforms from charges of molten glass deposited on the top surfaces of neck ring mold assemblies and associated mold halves in an overlying relationship with a glass forming cavity such as 15 formed by the neck ring mold halves.

We claim:

1. A neck ring mold mechanism for a pair of complemental and cooperative neck ring mold halves, said mechanism comprising;
    (A) a first neck ring mold assembly including,
        (a) a holder for supporting a first of said neck ring mold halves on a first end of such holder,
        (b) first and second plate members associated with said holder and disposed in an upper and lower facing relationship with each other to form a cavity therebetween extending in a horizontal plane and embodying the second end of said holder for linear sliding movement thereof within such cavity in alignment with the centers of said ends of such holder,
        (c) actuating means secured to said holder and operating when actuated between first and second positions to impart said linear movement to such holder to move the holder between retracted and extended positions within said cavity, and
        (d) means for supporting said plate members for limited and lateral floating movement thereof in a horizontal plane extending parallel with said plane of said cavity;
    (B) a second neck ring mold assembly identical to said first assembly and including a holder for supporting the second of said neck ring mold halves on the first end of such holder;
    (C) means supporting said first and second neck ring mold assemblies with said neck ring mold halves in a facing relationship with each other when the respective holder for each such mold half is in its said retracted position, and with the mold halves in a contacting cooperative and complemental relationship to form a neck ring mold cavity with each other when the respective holder for each mold half is in its said extended position; and
    (D) an arcuate channel embodied in the top surface of said holder of each said neck ring mold assembly, such channels being cooperative with downwardly extending fingers on the lower end of a vertically actuable blow-head assembly when said holders are in said extended positions, whereby such holders and said mold halves are locked in said extended and cavity forming positions respectively when said blow-head assembly is actuated downwardly and inserts said fingers into said channels.

2. A neck ring mold mechanism in accordance with claim 1 and further including a parison mold cooperative with the bottoms of said neck ring mold halves for the forming of a parison from a charge of molten glass supplied to the top surfaces of said holders and said mold halves in an overlying relationship with said cavity formed by the mold halves.

3. A neck ring mold mechanism in accordance with claim 2 and in which said charge of molten glass is a section of a ribbon of molten glass.

4. A neck ring mold mechanism in accordance with claim 3 and in which said ribbon of molten glass is conveyed through a selected path of travel and said neck ring mold assemblies of said mechanism aid in such conveyance.

5. A neck ring mold mechanism in accordance with claim 4 and in which said neck ring mold assemblies of such mechanism are, for purposes of aiding in said conveyance of said ribbon, movable along tracks paralleling said selected path of travel of the ribbon.

6. A neck ring mold mechanism in accordance with claim 4 and in which said neck ring mold assemblies of such mechanism are supported on suitable tracks paralleling said selected path of travel through which said ribbon of molten glass is conveyed.

7. A neck ring mold assembly comprising, a pair of separable complimentary neck ring mold halves forming an annular orifice therebetween, plate means including a pair of slidable plates for supporting said mold halves for movement toward and away from each other, crank arm means for initiating movement of said slidable support plates toward one another and for retracting said plates, and flexible mounting means on each said support plate means for facilitating the alignment of said plates when such plates are moved into engagement with one another.

8. A neck ring mold assembly as defined in claim 7 including a tongue portion protruding from an extending about a semicircular outer periphery of each said mold half, complemental channels formed in opposed faces of said support plate means, said tongue portion of each said mold half projecting within the complemental channel of an associated one of said support plate means to retain said mold half in said support means with relative rotational movement therebetween, and means for removably securing each of said mold halves in their respective support plate means.

9. A neck ring mold assembly as defined in claim 8 including projection means on a forward face of one of said mold halves and complementary recess means formed on an opposed face of the other of said mold halves to receive said projection means and facilitate alignment of said mold halves when they are moved into engagement with each other.

References Cited

UNITED STATES PATENTS

| | | | |
|---|---|---|---|
| 767,811 | 8/1904 | Good, Jr. | 65—361X |
| 1,679,502 | 8/1928 | Sears | 65—184X |
| 1,875,202 | 8/1932 | Aftergut | 65—235X |
| 1,919,177 | 7/1933 | Soubier | 65—361X |
| 1,943,195 | 1/1934 | Van Ness | 65—184 |
| 2,391,963 | 1/1946 | Gray | 65—240 |
| 2,593,771 | 4/1952 | Laidig | 65—242X |
| 3,434,820 | 3/1969 | Zappia et al. | 65—242X |

FRANK W. MIGA, Primary Examiner

U.S. Cl. X.R.

65—359, 361, 264